(12) United States Patent
Friske et al.

(10) Patent No.: US 10,801,450 B2
(45) Date of Patent: Oct. 13, 2020

(54) INTAKE SYSTEM ASSEMBLY AND METHOD FOR MANUFACTURING THE ASSEMBLY

(71) Applicant: Ford Global Technologies, LLC, Dearborn, MI (US)

(72) Inventors: David Friske, Wolverine Lake, MI (US); Victor Martinez, Novi, MI (US); John Jeffrey Pfeiffer, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 16/032,781

(22) Filed: Jul. 11, 2018

(65) Prior Publication Data
US 2020/0018270 A1    Jan. 16, 2020

(51) Int. Cl.
| F02M 35/104 | (2006.01) |
| F02M 31/20 | (2006.01) |
| F02B 29/04 | (2006.01) |
| F02M 35/10 | (2006.01) |
| B22F 3/105 | (2006.01) |
| B22F 3/11 | (2006.01) |
| B33Y 10/00 | (2015.01) |
| B33Y 80/00 | (2015.01) |

(52) U.S. Cl.
CPC ..... F02M 35/10262 (2013.01); B22F 3/1055 (2013.01); B22F 3/1115 (2013.01); F02B 29/0431 (2013.01); F02M 31/20 (2013.01); F02M 35/104 (2013.01); F02M 35/1034 (2013.01); B33Y 10/00 (2014.12); B33Y 80/00 (2014.12)

(58) Field of Classification Search
CPC ......... F02M 35/10262; F02M 35/1034; F02M 35/104; F02M 31/20; F02B 29/04; F02B 29/0425; B22F 3/1055; B22F 3/1115; B33Y 10/00; B33Y 80/00
See application file for complete search history.

(56) References Cited

U.S. PATENT DOCUMENTS

| 7,204,329 | B2 | 4/2007 | Pfohl et al. | |
| 2004/0110429 | A1 | 6/2004 | Wizgall | |
| 2011/0253080 | A1* | 10/2011 | Newman | F02M 35/10321 123/54.4 |
| 2012/0152501 | A1 | 6/2012 | Harvey et al. | |
| 2013/0220289 | A1 | 8/2013 | Maceroni et al. | |
| 2014/0186174 | A1* | 7/2014 | Malfa | F01D 25/24 415/220 |
| 2014/0299091 | A1* | 10/2014 | Ribeiro | F02F 3/0084 123/193.6 |
| 2018/0087443 | A1 | 3/2018 | Adriany et al. | |

FOREIGN PATENT DOCUMENTS

| WO | 2005116415 A1 | 12/2005 |
| WO | 2009027492 A1 | 3/2009 |

* cited by examiner

*Primary Examiner* — Jacob M Amick
(74) *Attorney, Agent, or Firm* — Geoffrey Brumbaugh McCoy Russell LLP (57) ABSTRACT

An intake system assembly including an intake manifold including a housing defining an interior conduit in fluidic communication with an intake valve and a lattice structure extending from an outer surface of the housing. The lattice structure includes a plurality of intersecting walls and the lattice structure and the housing form a continuous piece of material.

20 Claims, 4 Drawing Sheets

INTAKE SYSTEM ASSEMBLY AND METHOD FOR MANUFACTURING THE ASSEMBLY

FIELD

The present description relates generally to an intake system assembly with an intake manifold and lattice structure.

BACKGROUND/SUMMARY

In certain engine designs, intake air is cooled to deliver air with increased density to the engine's cylinders to increase combustion efficiency. Intercoolers and other liquid coolant heat exchangers, for instance, have been employed in engines with compressors, exhaust gas recirculation (EGR) arrangements, combinations thereof, etc.

US 2013/0220289, for example, discloses an intake assembly with a charge air cooler integrated into an intake manifold. The charge air cooler directs coolant through passages in the manifold to cool compressed intake airflow to reduce the temperature of the intake air. However, the inventors have recognized several issues with the intake assembly disclosed US 2013/0220289. For instance, the charge air cooler disclosed in US 2013/0220289 may be structurally complicated, thereby increasing the assembly's construction cost and likelihood of degradation, malfunction, failure, etc. Furthermore, the charge air cooler may also increase losses in the intake airflow thereby diminishing some of the efficiency gains achieved by turbocharger air compression. Moreover, the charge air cooler's susceptibility to degradation may lead to increased repair costs and reliability concerns amongst consumers.

To overcome at least some of the aforementioned problems an intake system assembly is provided, in one example. The intake system assembly includes an intake system assembly including an intake manifold having a housing defining an interior conduit in fluidic communication with an intake valve and a lattice structure extending from an outer surface of the housing. The lattice structure includes a plurality of intersecting walls and forms a continuous piece of material with the housing of the intake manifold. The lattice structure provides both structural reinforcement to the intake manifold and allows heat to be withdrawn from the airflow traveling through the intake manifold via airflow ducts extending through the lattice structure. In this way, the lattice structure acts as an air-to-air heat exchanger and as a structural member of the intake manifold.

The lattice structure and the manifold housing may be additively manufactured to form a continuous shape. The additive manufacturing of both the lattice structure and the manifold housing allows more complicated shapes to be designed such as a lattice structure that is curved along a height, width, and/or length of the structure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An intake system is described herein that includes an additively manufactured structural assembly. The assembly has an intake manifold and a lattice structure extending from an outer surface of the housing of the manifold. Due to the additive manufacturing the intake manifold and the lattice structure form a continuous shape. Additionally, the lattice structure has a plurality of intersecting walls that serve the dual use of reinforcing the manifold and providing airflow channels that draw heat out of the intake air flowing through the manifold. Thus, the lattice structure achieves both increased manifold structural reinforcement as well as increased heat removal capabilities when compared to previous intake systems including separately manufactured components. Specifically, by additively manufacturing the intake manifold and the lattice structure a continuous shape can be formed which is more structurally complex than previous systems employing separately manufactured manifolds and heat exchangers. For instance, the lattice structure may include walls having a 2-dimensional curvature along their lengths, widths, and/or heights. Manufacturing the intake manifold and lattice structure in this way allows both the structural reinforcement and heat transfer characteristics of the lattice structure to be tuned to meet end-use design goals. Such design goals may include increasing the amount of heat removed from intake air flowing through the intake manifold as well as increasing the assembly's strength to weight ratio. Consequently, the assembly can be adapted for a wide variety of intake system arrangements while achieving desired heat transfer and structural reinforcement objectives.

Figure 1:
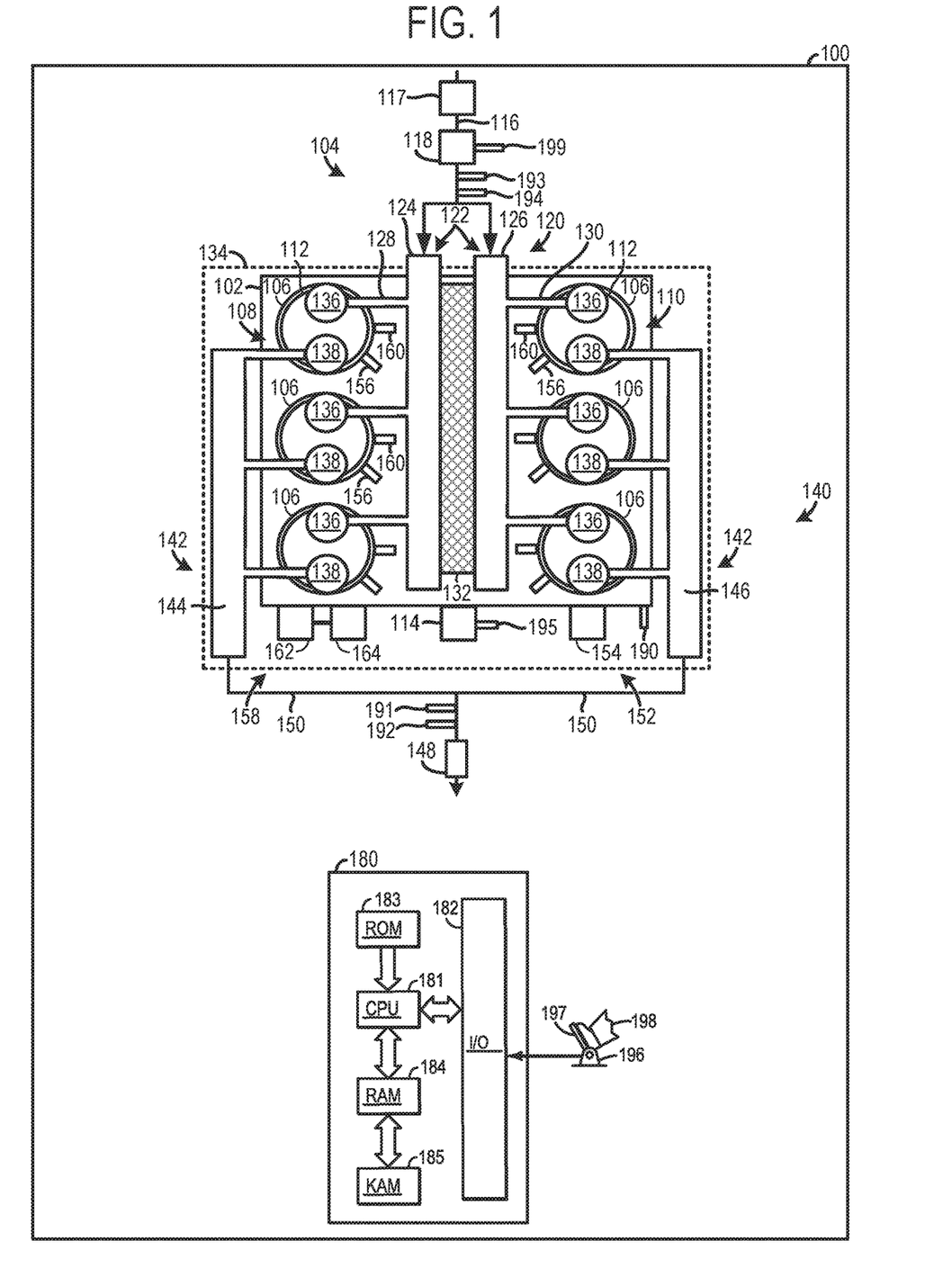
FIG. 1 shows a schematic depiction of a vehicle including an engine having an intake system assembly with an intake manifold and lattice structure.
Figure 2:
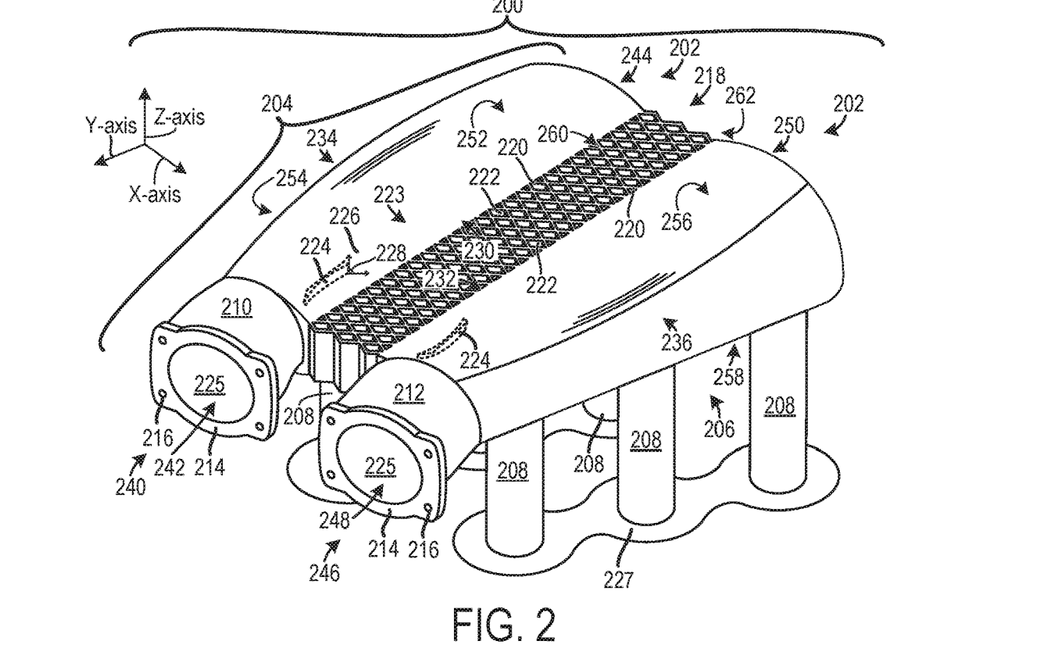
FIG. 2 shows an example of the intake system assembly.
Figure 3:
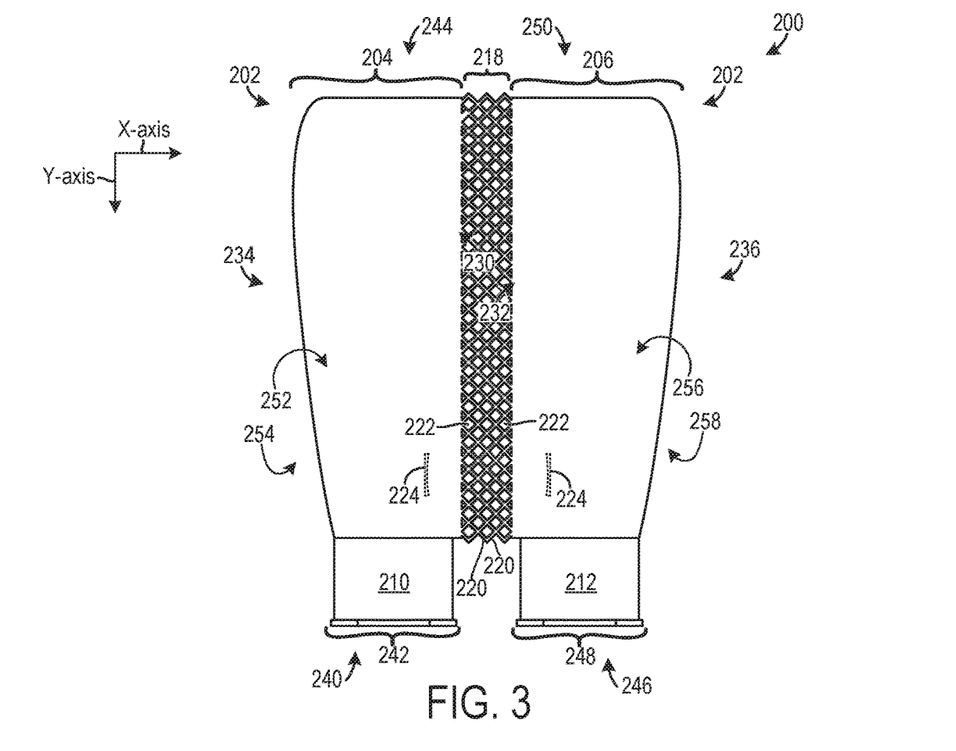
FIG. 3 shows a top view of the intake system assembly, shown in FIG. 2.
Figure 4:
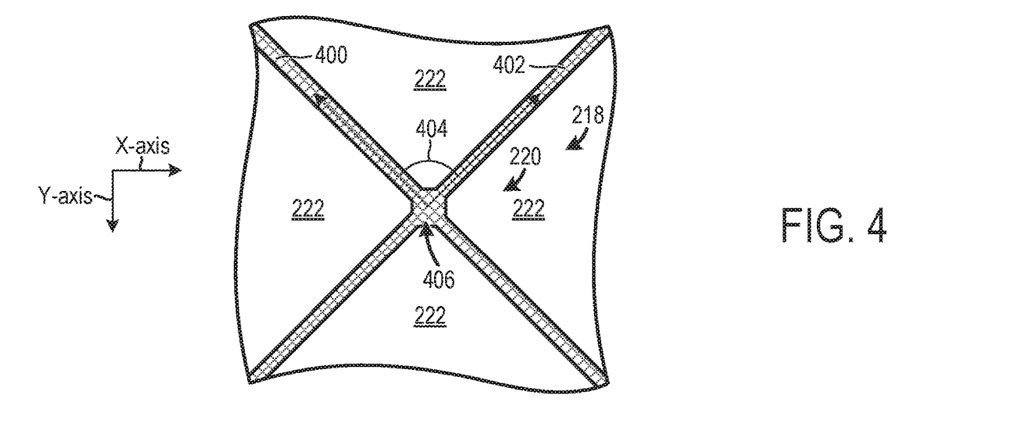
FIG. 4 shows a detailed view of the lattice structure in the intake system assembly, shown in FIG. 2.
Figure 5:
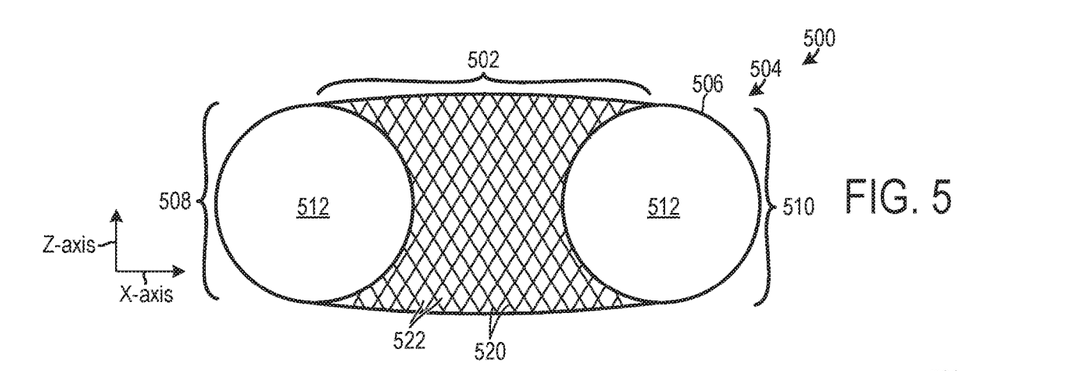
FIG. 5 shows another example of an intake system assembly.
Figure 8:
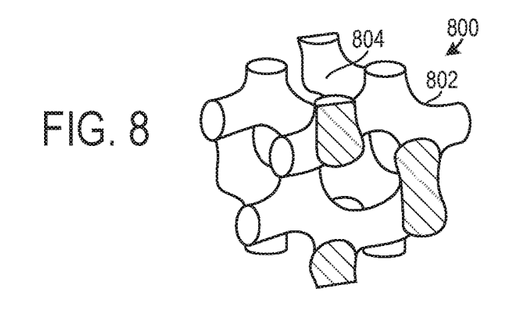
Figure 9:
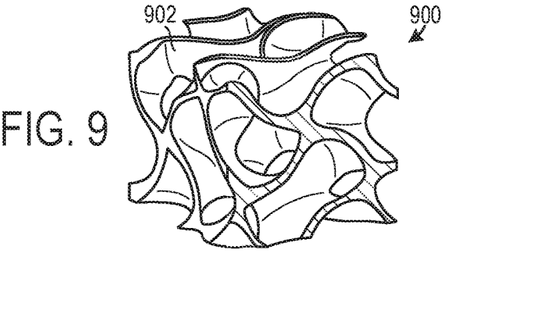
Figure 10:
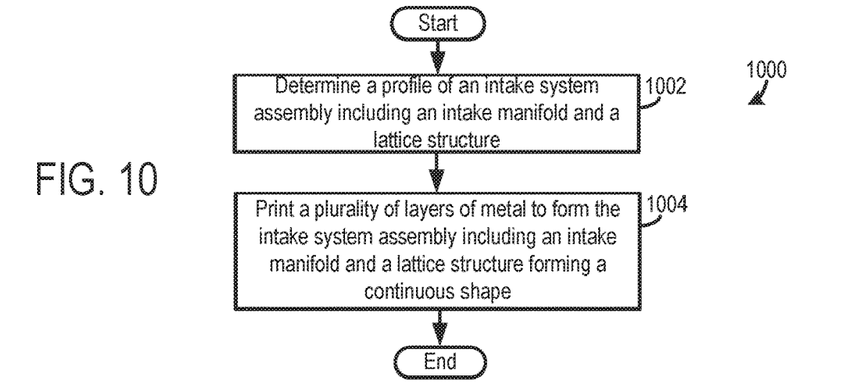
FIG. 10 shows a method for manufacturing an intake system assembly.
Figure 11:
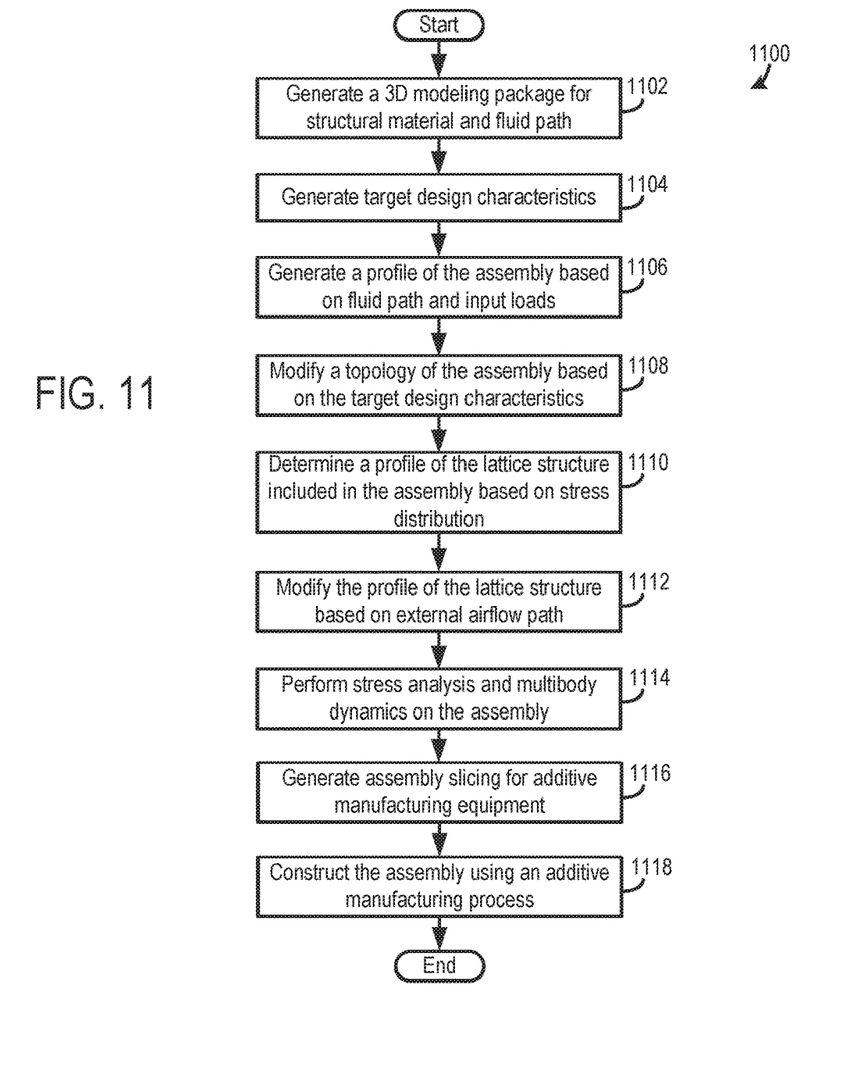
FIG. 11 shows a more detailed method for manufacturing an intake system assembly.

FIG. 1 shows a depiction of a vehicle including an engine and an intake system with an assembly having intake manifold and lattice structure. FIG. 2 shows an example of an intake system assembly including an additively manufactured intake manifold and lattice structure. FIG. 3 shows a top view of the intake system assembly, shown in FIG. 3. FIG. 4 shows a detailed view of a portion of the lattice structure shown in FIG. 2. FIG. 5 shows another example of an intake system assembly. FIG. 6-9 shows different examples of unit cells that may be included in the lattice structures in the intake system assemblies, shown in FIGS. 2-5. FIG. 10 shows a method for manufacturing an intake manifold assembly. FIG. 11 shows a more detailed method for manufacturing an intake manifold assembly.

FIG. 1 shows a schematic representation of a vehicle 100 including an internal combustion engine 102. Although, FIG. 1 provides a schematic depiction of various engine and engine system components, it will be appreciated that at least some of the components may have different spatial positions and greater structural complexity than the components shown in FIG. 1. Specifically, detailed examples of an intake system assembly 120, shown in FIG. 1, are illustrated in FIGS. 2-4, and described in greater detail herein.

An intake system 104 providing intake air to cylinders 106, is also depicted in FIG. 1. It will be appreciated that the cylinders may be referred to as combustion chambers. The cylinders 106 may be conceptually divided into a first cylinder bank 108 and a second cylinder bank 110. Each cylinder bank includes one or more cylinders. Specifically, in the illustrated example, the first and second cylinder banks, 108 and 110, each include three cylinders. However, cylinder banks with alternate number of cylinders (e.g., a single cylinder, more than three cylinders, etc.,) have been contemplated. Moreover, engines with one bank have been contemplated, such as inline cylinder configurations, single cylinder engines, etc.

Pistons 112 are positioned in each of the cylinders 106. The pistons 112 are coupled to a crankshaft 114 via a piston rod (now shown) and/or other suitable mechanical components. Thus, reciprocal motion of the pistons may be transferred into rotational crankshaft motion. It will be appreciated that the crankshaft 114 may be coupled to a transmission providing motive power to a drive wheel (not shown).

The intake system 104 includes an intake conduit 116 and a throttle 118 coupled to the intake conduit. The throttle 118 is configured to regulate the amount of airflow provided to the cylinders 106. For instance, the throttle 118 may include a rotatable plate varying the flowrate of intake air passing there through. However, numerous throttle configurations have been contemplated.

In one example, the engine 102 may be boosted via a turbocharger and/or a supercharger. Thus, the engine 102 may include a compressor 117 designed to increase the pressure of the gas flowing there through. The compressor 117 may include a rotor with blades rotating about a shaft to achieve a pressure increase in the intake airflow. However, other types of compressors have been contemplated. Further, in other examples, the compressor 117 may be omitted from the intake system. It will be appreciated that the compressor 117 may be rotationally coupled to a turbine (not shown) positioned in an exhaust system 140, in one example. However, in other examples, the compressor 117 may be rotationally coupled to the crankshaft 114.

In the depicted example, the throttle 118 feeds air to the intake system assembly 120. The intake system assembly 120 is schematically depicted in FIG. 1. However, it will be appreciated that the intake system assembly 120 has greater structural complexity than is illustrated in FIG. 1. The structural features of the intake system assembly 120 are described in greater detail herein with regard to FIGS. 2-4.

The intake system assembly 120 includes an intake manifold 122 including a first section 124 and a second section 126. In the illustrated example, the first section 124 is spaced away from the second section 126. Thus, the first and second sections 124 and 126 may be discrete sections that are fluidly separated. In this way, the airflow through each section may be discrete. However, in other examples, the sections may have different configurations. For instance, the sections may share a common inlet and then separate along a length of the manifold and/or share a common wall defining internal airflow conduits in each section. The first section 124 has runners 128 extending therefrom and fluidically coupling the intake manifold 122 to the cylinders in the first cylinder bank 108. Likewise, the second section 126 has runners 130 extending therefrom and fluidically coupling the intake manifold 122 to the cylinders in the second cylinder bank 110. In this way, the intake manifold 122 may feed air to the cylinders 106. The runners 128 and 130 are illustrated as separate conduits spaced away from one another. However, other runner layouts have been contemplated. For instance, the runners may be fluidly separated conduits which share adjoining walls.

It will be appreciated that, in other examples, the intake manifold 122 may be formed as a single section. In such an example, a housing of the intake manifold may form a continuous shape with a continuous material uninterrupted by connecting joints, seams, and without separate pieces being held together with a connecting element (such as a bolt or screw) or glue/adhesive, in one example. However, in other examples, the intake manifold may include more than two discrete sections. In such an example, the sections of the intake manifold may be spaced away from one another.

The intake system assembly 120 also includes a lattice structure 132. As described herein a lattice structure is a geometric structure with a unit cell that is duplicated (e.g., tessellates) along one or more axis such that there are not gaps between the unit cells. Each of the unit cells may include segments that are joined at nodes at predetermined angles, in some examples. It will be appreciated that additive manufacturing of the lattice structure may allow the unit cells to have greater structural complexity, such as curved segments, tapered segments, etc., that allow for greater amounts of heat transfer when compared to other manufacturing techniques such as casting, extrusion, etc. In one example, the unit cells may form a microstructure that may be arranged into a macrostructure. For instance, walls in the lattice structure may each be formed of separate sets of a plurality of unit cells. The walls in turn may be arranged such that they intersect to form airflow channels, thereby forming the macrostructure. However, in other examples, the unit cells may directly form the macrostructure. For instance, the unit cells may be the parallelograms surrounding the airflow channels. However, numerous unit cell structures and arrangements have been envisioned.

The lattice structure 132 extends between the first section 124 and the second section 126 of the intake manifold 122. The lattice structure 132 and the intake manifold 122 may be additively manufacture such that a continuous and uninterrupted shape is formed. Specifically, in one example, the intake manifold 122 and the lattice structure 132 may be formed from a continuous material uninterrupted by connecting joints, seams, and without separate pieces being held together with a connecting element (such as a bolt or screw) or glue/adhesive.

The lattice structure 132 includes a plurality of intersecting walls, described in greater detail herein with regard to FIGS. 2-9. The lattice structure 132 is designed to increase the structural integrity of the intake manifold and increase an amount of heat removed from air flowing through the intake manifold. The lattice structure 132 may also be designed with compliant characteristics, in some examples. Specifically, the lattice structure may be designed to function as an air-to-air heat exchanger to enable the heat transfer from the lattice structure to air in the surrounding environment. In such an example, the lattice structure also serves to structurally reinforce the intake manifold 122. Air channels between the intersecting walls may serve as part of the heat exchanger mechanism. In this way, the temperature of the intake air traveling through the intake manifold may be reduced, thereby increasing the density of the intake air entering downstream cylinders. Consequently, engine combustion efficiency may be increased and emissions may be reduced. In one example, in the case of a boosted engine, an air-to-liquid heat exchanger (e.g., charge air cooler) in the engine may be downsized, in some examples, or omitted, in other examples, when the lattice structure is used in the intake system assembly. Coolers slated for cooling exhaust gas recirculation flow may also be downsized when the lattice structure is used in the intake system. As a result, the cost and size of the intake system may be reduced. Consequently, the intake system may be efficiently packaged in the vehicle and the cost of the intake system may be reduced, if desired.

The intake system assembly 120 may be formed from a continuous piece of material. In this way, the intake system assembly 120 may have an unbroken shape. As such, the intake system assembly 120 may not have any discrete sections that are discontinuous (e.g., detached) from other sections of the assembly. Thus, the interfaces between the walls of the lattice structure and the interfaces between the manifold sections may be seamless. That is to say, in one example, there may not be welds, mechanical attachment devices (e.g., screws, bolts, etc.,) at the interface between the lattice structure 132 and the manifold sections 124 and 126.

Furthermore, this continuous and uninterrupted shape of the intake system assembly 120 may be achieved by an additive manufacturing process (e.g., 3-D printing process). Thus, the intake system assembly 120 may be printed in layers. Manufacturing the intake system assembly 120 with a continuous profile increases the structural integrity of the assembly and may decease manufacturing costs when compared to previous manufacturing processes that separately manufacture components and then weld, bolt, and/or otherwise mechanically attached the components together. It will be appreciated that the intake system assembly 120 may also be constructed out of a single type of material (e.g., a metal). Specifically, in one example, the intake system assembly 120 may be constructed out of aluminum. However, in other examples, the intake system assembly 120 may be constructed out of another suitable material or combination of materials, such as a polymeric material, steel, etc.

Furthermore, when the intake system assembly 120 is additively manufactured such that it forms a continuous shape, attachment mechanisms (e.g., screws, bolts, welds, clamps, etc.,) between the lattice structure and the intake manifold may be omitted from the assembly, if desired. Consequently, manufacturing cost of the assembly may be reduced. For instance, the intake system assembly 120 may not include any attachment mechanisms such as screws, bolts, clamps, welds, combinations thereof, etc., in one example. Moreover, it will be appreciated that when the intake system assembly 120 is formed with a continuous shape, the structural integrity of the assembly may be increased when compared to assemblies including parts that are welded or bolted to one another.

The intake system assembly 120 is positioned in an engine compartment 134, in the example illustrated in FIG. 1. However, in other examples, at least a portion of the intake system assembly 120 may be positioned external to the engine compartment 134. The engine compartment 134 may enclose at least portions of the engine 102 such as the cylinders 106 and specifically the cylinder banks 108 and/or 110, in one example.

The airflow channels, shown in FIGS. 2-5 and described in greater detail herein, in the lattice structure 132 of the intake system assembly 120 may be designed to receive airflow from airflow within the engine compartment, in one example, or external to the engine compartment, in another example, based on the configuration of the intake system assembly 120. For instance, airflow above the engine compartment, such as airflow traveling along a vehicle hood may be directed into airflow channels in the lattice structure 132. In other examples, the lattice structure 132 may be positioned below the engine compartment 134. In such an example, the lattice structure 132 may be oriented in line with the airflow traveling under the vehicle such that air is directed into the airflow channels in the lattice structure 132. However, in other examples, the lattice structure 132 may be included in the engine compartment 134 and the airflow channels may be arranged complimentary to the airflow pattern in the compartment such that the airflow through the channels is increased. Furthermore, in such an example, the outflow of the lattice structure 132 may be directed into a section of the engine compartment 134 that is in fluidic communication with the region surrounding the compartment. In this way, the heated air can be drawn away from the lattice structure.

The intake system 104 also includes intake valves 136 coupled to the cylinders 106. The intake valves 136 open and close to allow intake airflow into the cylinders 106 at desired times. The intake valves 136, may each include in one example, a poppet valve with a stem and a valve head seating and sealing on a cylinder port in a closed position. However, numerous suitable valve configurations have been envisioned.

Exhaust valves 138 are also coupled to the cylinders 106. The exhaust valves 138 open and close to allow exhaust gas to be expelled from the cylinders 106 at desired times. The exhaust valves 138 may be poppet type valves or have other suitable configuration with the capability of opening/closing to allow/inhibit exhaust gas flow to downstream components.

The exhaust valves 138 are included in the exhaust system 140. The exhaust system 140 further includes an exhaust manifold 142 with a first section 144 and a second section 146. The first section 144 receives exhaust gas from the first cylinder bank 108. Likewise, the second section 146 receives exhaust gas from the second cylinder bank 110. The exhaust manifold 142 is in fluidic communication with an emission control device 148 via exhaust conduits 150. The emission control device 148 may include filters, catalysts, absorbers, combinations thereof, etc., for reducing tailpipe emissions. For instance, the emission control device 148 may include a three-way catalyst, a filter, etc.

The engine 102 also includes an ignition system 152 including an energy storage device 154 designed to provide energy to ignition devices 156 (e.g., spark plug). For instance, the energy storage device 154 may include a battery, capacitor, flywheel, etc. Suitable electrical conduits may be used to electrically couple the energy storage device 154 to the ignition devices 156. Additionally or alternatively, the engine 102 may perform compression ignition. Therefore, in one example, the ignition system 152 may be omitted from the engine 102.

FIG. 1 also shows a fuel delivery system 158. The fuel delivery system 158 provides pressurized fuel to fuel injectors 160. In the illustrated example, the fuel injectors 160 are direct fuel injectors coupled to the cylinders 106. Additionally or alternatively, the fuel delivery system 158 may also include port fuel injectors designed to inject fuel upstream of the cylinders 106 into the intake system 104. For instance, the port fuel injector may be an injector with a nozzle spraying fuel into an intake port at desired times. The fuel delivery system 158 includes a fuel tank 162 and a fuel pump 164 designed flow pressurized fuel to downstream components. For instance, the fuel pump 164 may be a pump driven by the engine's rotational output with a piston and an inlet in the fuel tank that draws fuel into the pump and delivers pressurized fuel to downstream components. However, other suitable fuel pump configurations have been contemplated. It will be appreciated that fuel lines (not shown) provide fluidic communication between the fuel pump 164 and the fuel injectors 160. The fuel delivery system 158 may include additional components such as a higher-pressure pump, valves (e.g., check valves), return lines, etc., to enable the fuel delivery system to inject fuel at desired pressures and time intervals.

During engine operation, each of the cylinders 106 typically undergoes a four-stroke cycle including an intake stroke, compression stroke, expansion stroke, and exhaust stroke. During the intake stroke, generally, the exhaust valve closes and intake valve opens. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited via a spark from an ignition device, resulting in combustion. However, in other examples, compression may be used to ignite the air fuel mixture in the combustion chamber. During the expansion stroke, the expanding gases push the piston back to BDC. A crankshaft converts this piston movement into a rotational torque of the rotary shaft. During the exhaust stroke, in a traditional design, exhaust valve is opened to release the residual combusted air-fuel mixture to the corresponding exhaust passages and the piston returns to TDC.

FIG. 1 also shows a controller 180 in the vehicle 100. Specifically, controller 180 is shown in FIG. 1 as a conventional microcomputer including: microprocessor unit 181, input/output ports 182, read-only memory 183, random access memory 184, keep alive memory 185, and a conventional data bus. Controller 180 is configured to receive various signals from sensors coupled to the engine 102. The sensors may include engine coolant temperature sensor 190, exhaust gas composition sensor 191, exhaust gas airflow sensor 192, an intake airflow sensor 193, manifold pressure sensor 194, engine speed sensor 195, etc.

Additionally, the controller 180 is also configured to receive a pedal position signal from a pedal position sensor 196 coupled to a pedal 197 actuated by an operator 198. The controller 180 is also configured to receive a throttle position signal from a throttle position sensor 199. It will be appreciated that adjustment in the position of the pedal 197 may prompt adjustments of the throttle 118.

Additionally, the controller 180 may be configured to trigger one or more actuators and/or send commands to components. For instance, the controller 180 may trigger adjustment of the throttle 118, fuel delivery system 158 (e.g., fuel injectors 160, fuel pump 164, etc.,) ignition system 152, etc. Specifically in one example, the controller 180 may send signals to an actuator in the throttle 118 that increase and decrease the degree of opening/closing of the throttle to facilitate throttle adjustment. Thus, the controller 180 may also send control signals to the throttle 118 to vary engine speed. Furthermore, the controller 180 may be configured to send control signals to actuators in the fuel pump 164 and the fuel injectors 160 to control the amount and timing of fuel injection provided to the cylinders 106. Other adjustable components in the engine 102 receiving commands from the controller 180 may also function in a similar manner.

In yet another example, the amount of component, device, actuator, etc., adjustment may be empirically determined and stored in predetermined lookup tables and/or functions. For example, one table may correspond to conditions related to throttle position and another table may correspond to conditions related to fuel injection metering. Moreover, it will be appreciated that the controller 180 may be configured to implement the methods, control strategies, etc., described herein. Specifically, the controller 180 may include computer readable instructions stored on non-transitory memory that when executed, cause the controller 180 implement the methods, control strategies, etc., described herein.

FIG. 2 shows an example of an intake system assembly 200. It will be appreciated that the intake system assembly 200 shown in FIG. 2 is an example of the intake system assembly 120 shown in FIG. 1. As such, the intake system assembly 200 may provide intake air to the engine cylinders 106, shown in FIG. 1. Moreover, the features of the intake system assembly 200 shown in FIG. 2 may be included in intake system assembly 120, shown in FIG. 1, or vice versa. Furthermore, it will be appreciated that the constituents of the intake system assembly 200, shown in FIG. 2, may form a continuous shape which may be achieved via an additive manufacturing process, such as the processes described herein with regard to FIGS. 10-11.

Reference axes X, Y, and Z are provided in FIGS. 2-5 for reference. In one example, the X-axis may be a lateral axis and the Y-axis may be a longitudinal axis. Additionally, the Z-axis may be parallel to a gravitational axis. It will be appreciated, that other orientations of the axes have been contemplated.

Referring specifically to FIG. 2, the intake system assembly 200 is shown including an intake manifold 202. The intake manifold 202 includes a first section 204 and a second section 206. The first section 204 and the second section 206 are designed to flow intake air to downstream cylinders via runners 208. As shown, the runners 208 vertically extend from the first and second sections 204 and 206. Additionally, the runners 208 have a straight profile, in the illustrated example. However, other runner orientations and profiles have been contemplated. For instance, in other examples, the runners may arc with regard to the X-axis to allow the runners to interface with the intake valves. The runners 208 may be sized to achieve desired airflow rates in the intake system.

The first section 204 includes an inlet portion 210 which may be coupled to and receive air from upstream components such as the throttle, compressor, intake conduit, etc. Likewise, the second section 206 includes an inlet portion 212. The inlet portions, 210 and 212, include flanges 214 with openings 216 which may receive attachment apparatuses (e.g., bolts, screws, etc.,) attached to the upstream component.

The intake system assembly 200 includes a lattice structure 218 extending between the first section 204 and the second section 206. The lattice structure 218 includes a plurality of intersecting walls 220. The plurality of walls 220 includes a first set of walls that intersect a second set of walls at similar angles, in one example. In this way, the walls form a lattice shape. In such an example, the walls in the first set of walls may be parallel to one another and the walls in the second set of walls may be parallel to one another. Additionally, in one example, the walls may be planar. Specifically, the walls may have two planar faces having a rectangular shape. However, in other examples, the walls may be curved alone their length and/or height. In other examples, one or more of the faces of the walls may have a non-planar contour such as a curved or convex shape or a textured shaped which is conducive to deceasing turbulence in the air passing through the lattice structure.

A plurality of airflow channels 222 through which air can travel may be positioned between the plurality of walls 220. In particular, the plurality of walls 220 form a boundary of the airflow channels 222. The walls 220 extend laterally between the first and second sections of the intake manifold 202. Additionally, in one example, the walls 220 may extend in a vertical direction and extend across the manifold in a horizontal direction. Furthermore, the airflow channels 222 extend from a top side 260 of the lattice structure 218 to a bottom side 262 of the lattice structure 218.

The walls 220 are shown extending from a housing 223 of the intake manifold 202. The housing 223 defines interior conduits 225 through which intake air flows. The interior conduits 225 are in fluidic communication with the runners 208 which provide air to downstream intake valves, such as the intake valves 136, shown in FIG. 1. It will be appreciated that the runners 208 may be directly coupled to the intake valves, in one example. Moreover, it will be appreciated that inlets of the runners 208 open into the interior conduits 225. The runners 208 are shown including a flange 227, in the illustrated example. The flange 227 may be coupled to downstream components. However, in other examples, the flange 227 may be omitted from the intake system assembly 200.

As shown, the lattice structure 218 is laterally positioned between (e.g., interposed) the first section 204 and the second section 206 of the intake manifold 202. Specifically, the lattice structure 218 extends between an inner side 230 of the first section 204 and inner side 232 of the second section 206. The first section 204 also includes an outer side 234 and the second section 206 likewise includes an outer side 236. The first section 204 also includes an upstream side 240 where an inlet 242 is located and a downstream side 244. Likewise, the second section 206 includes an upstream side 246 where the inlet 248 is located and a downstream side 250. The first section 204 include a top side 252 and a bottom side 254. Likewise, the second section 206 includes a top side 256 and a bottom side 258. The lattice structure 218 is illustrated as extending from the top sides of the manifold sections to the bottom sides of the manifold sections. However, numerous lattice structure profiles have been contemplated. For instance, in other examples, the walls 220 may extend vertically down at least a portion of the length of the runners 208. In such an example, the walls 220 may also extend between runners protruding from the two manifold sections. However, in other examples, the walls may not extend laterally between the runners. Still, further in other examples, the lattice structure 218 may extend between a portion of the laterally offset runners. In yet another example, the lattice structure 218 may extend down the runners 208 to their interfaces with the intake valves. However, in other examples, the lattice structure 218 may extend down upper sections of each of the runners 208 or in some cases may extend down upper sections in a portion of the runners. For instance, the lattice structure 218 may extend between the leading and/or trailing pairs of runners. However, numerous lattice structure configurations have been contemplated.

FIG. 2 also shows flow diverters 224 designed to direct airflow into the lattice structure 218 are included in the intake system assembly 200. The flow diverters 224 is shown coupled to an outer surface 226 of the housing 223 of the intake manifold 202. The flow diverters 224 form an angle 228 with the housing 223 of the intake manifold 202. In one example, the angle 228 may be a non-perpendicular angle. However, numerous angle orientations between the flow diverters 224 and the housing 223 have been contemplated.

It will be appreciated that the flow diverters 224 may be additively manufactured along with the intake manifold 202 and the lattice structure 218. The flow diverters 224 may be arranged to divert air into the airflow channels 222 positioned between the intersecting walls 220 in the lattice structure. In one example, a metal laser sintering process may be used to manufacture the assembly. However, numerous types of additive manufacturing processes have been contemplated. The manufacturing method is described in greater detail herein with regard to FIGS. 10 and 11.

FIG. 3 shows a top view of the intake system assembly 200 shown in FIG. 2. The first section 204 and the second section 206 of the intake manifold 202 are again shown with the lattice structure 218 extend between the sections. However, in other examples, the lattice structure 218 may extend between the intake manifold sections in a vertical and/or longitudinal direction. It will be appreciated that the first section 204 and the second section 206 have a mirrored profile in the illustrated example. However, geometric variations between the sections have been contemplated.

The inner side 230, outer side 234, upstream side 240, downstream side 244, bottom side 254, and top side 252 of the first section 204, are illustrated in FIG. 3. Likewise, the inner side 232, outer side 236, upstream side 246, downstream side 250, bottom side 258, and top side 256 of the second section 206 are also shown in FIG. 3. The intersection walls 220 and the airflow channels 222 of the lattice structure 218 are again depicted along with the inlet 242 of the first section 204 and the inlet 248 of the second section 206.

The flow diverters 224 included in the intake system assembly 200 are also illustrated in FIG. 3. The flow diverters 224 serve to direct airflow into the airflow channels 222. However, in other examples, the flow diverters 224 may be omitted from the assembly. Still further, in other examples, additional or alternative flow diverters may be included in the assembly. For instance, flow diverters may extend from the inlets 210 and 212 of the first and sections 204 and 206, respectively. However, numerous flow diverter locations and/or profiles have been contemplated.

Further, in one example, in the case of the intake manifold formed from a single body, the lattice structure 218 may extend from an outer surface of a housing of the intake manifold 202 at one end while having a second end opposing the first end that is not attached to the housing of the intake manifold. In this way, the walls in the lattice structure may be structured as cantilevers. Further, in other examples, a portion of the walls in the lattice structure may interface with the housing of the intake manifold. Further, in other examples, the walls in the lattice structure may be curved to match a curved contour of the intake manifold housing.

FIG. 4 shows a detailed view of two of the intersecting walls 220 in the lattice structure 218. Specifically, a first wall 400 is shown intersecting a second wall 402 at an angle 404.

In one example, the angle may be 30°, 45°, or 90°, in some examples. Specifically, in one example, the angle 404 may be an angle between 30°-60°. In yet another example, the angle may be between 30°-90°. When the walls are arranged in this manner, a desired airflow pattern through the lattice structure may be generated that is conducive to increasing the amount of heat transfer from the lattice structure to the surrounding environment.

The first wall 400 meets the second wall 402 at an intersection 406. At the intersection 406 a continuous shape is formed where the material forming the lattice structure is uninterrupted. When the lattice structure is formed in this way the structural integrity of the structure may be increased while retaining a shape that allows a desired amount of air the pass through the airflow channels. Consequently, the structural integrity of the intake system assembly 200, shown in FIGS. 2 and 3, is increased while also increasing the amount heat transferred from the intake air to the surrounding environment when compared to previous intake manifolds including a solid section of material connecting the manifold sections.

The angle 404 may be selected based on the expected airflow pattern around the intake system assembly 200, shown in FIGS. 2 and 3, to increase the amount of air flowing through the channels 222. The first and second walls may be additively manufactured such that layers of the structure are formed in a stepwise manner. The additive manufacturing process, is discussed in greater detail herein with regard to FIGS. 10 and 11.

The airflow channels 222 in the intake system assembly 200, shown in FIGS. 2 and 3, are positioned between the walls 220. As previously discussed, the airflow channels 222 may be oriented such that airflow around the intake system assembly 200 is directed through the airflow channels 222 to increase heat transfer from the lattice structure 218 to the surrounding environment.

FIG. 5 shows a second example of an intake system assembly 500. The intake system assembly 500 may be included in the vehicle 100 and specifically the intake system 104, shown in FIG. 1. Furthermore, intake system assembly 500 includes a lattice structure 502 with a different orientation than the lattice structure 218, shown in FIGS. 2-4. However, it will be appreciated that the intake manifold 504 to which the lattice structure 502 is attached may have a similar shape and feature to the intake manifold 202, shown in FIGS. 2-3. Furthermore, the intake manifold 504 and the lattice structure 502 may be formed via additive manufacturing, as previously discussed. For instance, the uninterrupted structure formed between the intake manifold 504 and the lattice structure 502 may not include any connecting joints, seams, etc., and may not be held together via connecting elements (e.g., screws, bolts, clamps, etc.,) adhesive, etc.

The lattice structure 502 includes a plurality of walls 520. The walls 520 intersect to form flow channels 522. The flow channels extend longitudinally down the intake manifold 504. In this way, air may be circulated in a direction that is in line with the general direction of intake airflow through the intake manifold. In this way, the amount of heat transferred from the intake airflow to the surrounding environment through the lattice structure may be increased when the external airflow follows a generally longitudinal direction. However, it will be appreciated that numerous suitable lattice structure designs have been contemplated.

The intake manifold 504 includes a housing 506, a first section 508, and a second section 510. Additionally, the intake manifold 504 includes interior conduits 512 in fluidic communication with upstream intake system components such as one or more throttles, air filters, conduits, etc., as well as downstream components such as intake runners, an intake manifold, intake valves, etc.

It will be appreciated that the shape of the lattice structure 502 as well as the other lattice structures described herein, may be chosen based on a trade-off between weight reduction and a desired structural integrity of the manifold. For instance, if the end-use environment for the intake manifold is expected to experience higher stress the lattice structure may be designed with thicker walls to increase the strength of the manifold assembly. On the other hand, if the expected stresses in the end use environment are low the wall thickness may be decreased. Furthermore, the lattice structure may also be designed with a desired compliance in selected areas to allow energy absorption, thereby cushioning external loads. The compliance of the lattice structure is a function of its geometry and the material from which it is manufactured.

Furthermore, other lattice structure configurations have been contemplated, in other examples. For instance, the lattice structure 132, shown in FIG. 2, and/or the lattice structure 502, shown in FIG. 5, may have two distinct unit cells. A unit cell may be a base unit from which the lattice structure is formed. Thus, the base unit may be tessellated to form a geometrically repeating lattice structure with a base geometric unit. It will be appreciated that in some examples, the lattice structure may be divided (e.g., laterally, longitudinally, diagonally, etc.,) into different sections having different unit cells. For instance, an upper or front portion of the lattice structure may be formed from a first unit cell and a bottom or rear portion of the lattice structure may be formed from a second unit cell different from the first unit cell. In this way, selected sections of the lattice structure may have different geometries with different characteristics such as heat transfer, structural reinforcement, and/or load dampening characteristics. Consequently, the adaptability of the lattice structure is increased, thereby expanding the structure's applicability.

FIGS. 6-9 show different examples of unit cells that may be included in the lattice structure 218, shown in FIG. 2, and/or the lattice structure 502, shown in FIG. 5. The unit cells shown in FIGS. 6-9 are microstructures that may be tessellated to form macrostructures, such as walls, in the lattice structure. However, numerous lattice cell arrangements have been contemplated.

Figure 6:
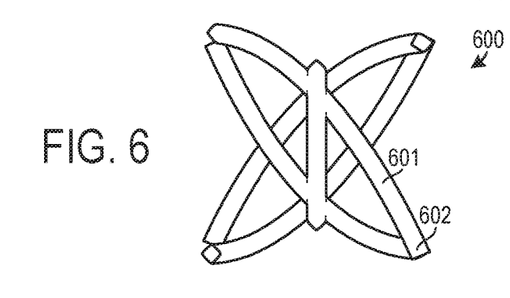
FIGS. 6-9 show different examples of unit cells that may be included in the lattice structures in the intake system assemblies, shown in FIGS. 2 and 5.
Figure 7:
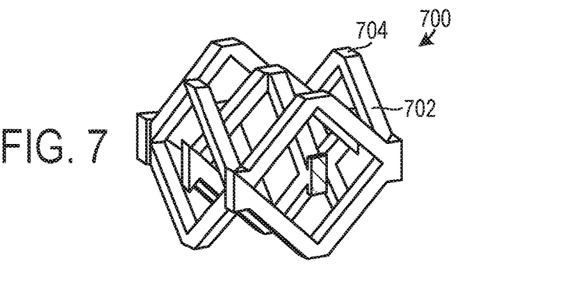

FIG. 6 specifically shows a unit cell 600 having curved segments 601 joined at nodes 602. FIG. 7 shows another unit cell 700 with substantially straight segments 702 joined at nodes 704. FIG. 8 shows a unit cell 800 with segments 802 having exterior curvature at the nodes 804. FIG. 9 shows, curved segments 902 of a unit cell 900. It will be appreciated that the unit cells shown in FIGS. 6-9 may be microstructures that can be sized and arranged into macrostructures which guide air or a coolant (e.g., water) there through to transfer heat from away from the intake manifold. As previously discussed, the microstructures (e.g., unit cell shapes) may change across the length, width, etc., of the lattice structure to achieve desired heat transfer and/or structural reinforcement characteristics.

FIGS. 2-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. For example, FIG. 2 shows the Z-axis as vertical with respect to gravity as one example.

FIG. 10 shows a method 1000 for manufacturing an intake system assembly. The method 1000 as well as the other manufacturing methods described herein may be used to manufacture the intake system assembly described above with regard to FIGS. 1-9. However, in other examples, the manufacturing methods may be used to manufacture other suitable intake system assemblies. Furthermore, the manufacturing method 1000 described in FIG. 10 as well as the other manufacturing methods described herein may be implemented via an additive manufacturing apparatus. The apparatus may include devices such as lasers (e.g., solid state laser), carriages, rollers, arms, optical sensors, temperature sensors, position sensors, powder metal reservoir, optical components (e.g., scanning mirror, lenses, etc.,) pistons, etc., designed to print the intake system assembly in layers. Furthermore, the additive manufacturing apparatus may include a controller including memory (e.g., non-transitory memory) and a processor. Instructions may be stored as code in the memory that is executable by the processor in the apparatus to implement the manufacturing processes described herein. However, in other examples, at least a portion of the method steps may be manually implemented.

Additionally, the additive manufacturing apparatus may include an interface (e.g., graphical user interface) which may be presented on a display. The interface may be configured to allow the manufacturing process to be at least partially manually controlled, in some examples, and/or may also enable personnel to monitor different aspect of the manufacturing processing during manufacturing. The additive manufacturing apparatus may also include input/output ports for receiving/sending data such as a profile of the intake system assembly. In this way, the additive manufacturing apparatus may interface with external computing devices.

At 1002 the method includes determining a profile of an intake system assembly including an intake manifold and a lattice structure. For instance, the intake system assembly may include an intake manifold with two sections spaced away from one another and a lattice structure extending between the two manifold sections, in one example. However, numerous intake system assembly profiles have been contemplated. For instance, in one example, the intake manifold may be formed as a single section and the lattice structure may be coupled at one side to a housing of the intake manifold. In such an example, the second side of the lattice structure may not be coupled to an intake system component.

Next at 1004 the method includes printing a plurality of layers of metal to form the intake system assembly including an intake manifold and a lattice structure forming a continuous shape. As previously discussed, the intake manifold includes a housing defining an interior conduit in fluidic communication with an intake valve. Furthermore, the lattice structure extends from an outer surface of the housing and the lattice structure includes a plurality of intersecting walls. Further, in one example, the lattice structure may be positioned external to an engine compartment or a portion of the lattice structure and/or assembly may be positioned external to the engine compartment. However, in other examples, the lattice structure may be positioned at least partially within the engine compartment.

In one example, the plurality of layers may be layers of metal, such as aluminum, in one example. However, other suitable materials may be used to construct the intake system assembly such as steel, a polymeric material, etc. Further, in one example, printing the plurality of layers of metal may include implementing a direct laser metal sintering process. In one example, the direct laser metal sintering process may include using a high power-density laser to melt and fuse metallic powders together to form the assembly.

FIG. 11 shows a method 1100 for manufacturing an intake system assembly. At 1102 the method includes generating a 3D modeling package for structural material and fluid path. For instance, the fluid path of a desired airflow through the intake system may be loaded into a 3D modeling package.

Next at 1104 the method includes generating target design characteristics of the intake system assembly. The target design characteristics may include boundary conditions, thermal requirements, packaging profile, etc. For instance, desired intake air temperatures in the intake system may be determined using various aspects of the intake system configuration, such as compressor type, throttle location, intake conduit profile, intake conduit length, air filter profile/size, etc.

At 1106 the method includes generating a profile of the intake system assembly based on the fluid path and input loads. For instance, a profile of the housing of the intake system assembly and/or interior flow path of the assembly may be ascertained along with expected external loading. At 1108 the method includes modifying a topology of the assembly based on the target design characteristics. For example, the topology of the intake system assembly may be altered to achieve the thermal requirements of the assembly. Thus, in one instance, the thickness of the intake manifold housing may be reduced in selected sections to increase the rate of heat transfer from the intake air to the intake manifold.

At 1110 the method includes determining a profile of the lattice structure included in the assembly based on stress distribution. For instance, the expected loads of the lattice structure may be determined and plugged into a stress distribution simulation for the lattice structure. It will be appreciated that the profile of the lattice structure may be changed based on the stress simulation. In some examples, the lattice structure's profile may be iteratively altered based on sequentially executed external loading simulations. Specifically, in one example, the profile of the lattice structure may be chosen such that structural integrity targets are met while reducing the weight of the assembly.

At 1112 the method includes modifying the profile of the lattice structure based on an external airflow path. For instance, the expected airflow path surrounding the intake system assembly may be predicted and the airflow pattern may be used to design a lattice structure that receives a targeted amount of airflow there through. For instance, the assembly may be positioned external to the engine compartment and the inlets of the airflow channels in the lattice structure may be aligned with the general direction of airflow in the region external to the engine compartment, in one example. In this way, the lattice structure may be designed to increase the airflow through air channels in the structure based on expected airflow patterns in the end use environment. Consequently, the amount of heat transferred from the air traveling through the manifold to the surrounding environment may be increased.

At 1114 the method includes performing stress analysis and multibody dynamics on the intake system assembly. At 1116 the method includes generating an assembly slicing for additive manufacturing equipment. For instance, the intake system assembly may be divided into layers for use in a 3D printing process. For instance, the intake system assembly may be divided into a plurality of planes which may be parallel to the X-Y plane, shown in FIGS. 2-4. However, in other examples, the assembly may be divided into planes parallel to the Z-Y or Z-X plane, shown in FIGS. 2-5. Thus, the planes allow the 3-dimensional profile of the assembly to be embodied in sections slated for printing.

Next at 1118 the method includes constructing the intake system assembly using an additive manufacturing process. In one example, the additive manufacturing process may include printing layers of metal to form the intake system assembly based on the profile generated in steps 1102-1116. Thus, the layers may be formed in a stepwise manner to construct the assembly with a desired profile. Further, in one example, the additive manufacturing process may be a direct laser metal sintering process where a laser (e.g., high power density laser) is used to melt and fuse metallic powder to form the assembly with the selected profile. For instance, a layer of powdered metal may be applied to a surface and then a high power density laser passes across the surface sintering the metal with a desired profile. This process may be repeated for each layer of the assembly to form the intake system assembly with a continuous profile. Additionally, in one example, the metallic powder may include aluminum while in other examples the metallic powder may include steel.

The intake system assembly described herein has the technical effect of increasing the assembly's structural integrity while providing increased heat transfer capabilities. For instance, the lattice structure described herein acts as an air-to-air heat exchanger as well as increases the assembly's shear, compressive, and tensile strength. As a result, the engine's combustion efficiency may be increased and emissions may be reduced due to the reduction in the temperature of the intake air. Furthermore, due to the intake system assembly's heat removal capabilities other heat exchangers (e.g., intercoolers) in the intake system may be downsized or in some cases omitted from the intake system. As a result, the cost and size of the intake system may be reduced.

The invention will be further described in the following paragraphs. In one aspect, an intake system assembly is provided that includes an intake manifold including a housing defining an interior conduit in fluidic communication with an intake valve and a lattice structure extending from an outer surface of the housing, where the lattice structure includes a plurality of intersecting walls, and where the lattice structure and the housing form a continuous piece of material.

In another aspect, a method for manufacturing an intake system assembly is provided that includes printing a plurality of layers of metal to form the intake system assembly including an intake manifold and a lattice structure forming a continuous shape, where the intake manifold includes a housing defining an interior conduit in fluidic communication with an intake valve, where the lattice structure extends from an outer surface of the housing, and where the lattice structure includes a plurality of intersecting walls.

In another aspect, an intake system assembly is provided that includes an additively manufactured intake manifold and lattice structure forming a continuous shape, where the intake manifold includes a housing defining an interior conduit in fluidic communication with a plurality of intake runners providing intake air to a plurality of intake valves, where the lattice structure extends from an outer surface of the housing, and where the lattice structure includes a plurality of intersecting walls defining a plurality of cooling passages positioned between the plurality of intersecting walls.

In any of the aspects or combinations of the aspects, the intake manifold may include a first section and a second section and the lattice structure extends between the first and second sections.

In any of the aspects or combinations of the aspects, the first section may be in fluidic communication with a first cylinder bank and the second section is in fluidic communication with a second cylinder bank.

In any of the aspects or combinations of the aspects, the intake system assembly may further comprise a flow diverter coupled to the housing and directing airflow into the lattice structure.

In any of the aspects or combinations of the aspects, the flow diverter may be arranged at a non-perpendicular angle with regard to the outer surface of the housing.

In any of the aspects or combinations of the aspects, the lattice structure may be positioned external to an engine compartment.

In any of the aspects or combinations of the aspects, the lattice structure and the housing may be constructed out of an equivalent material.

In any of the aspects or combinations of the aspects, the equivalent material may be aluminum.

In any of the aspects or combinations of the aspects, the intake manifold and the lattice structure may be cooperatively constructed using additive manufacturing.

In any of the aspects or combinations of the aspects, where the plurality of layers of metal may be layers of aluminum.

In any of the aspects or combinations of the aspects, printing the plurality of layers of metal may include implementing a direct laser metal sintering process.

In any of the aspects or combinations of the aspects, the lattice structure may be positioned external to an engine compartment.

In any of the aspects or combinations of the aspects, the intake manifold may include a first section and a second section and the lattice structure extends between the first and second sections.

In any of the aspects or combinations of the aspects, the intake manifold may include a first section and a second section and the lattice structure extends there between and where the first section is in fluidic communication with a first cylinder bank and the second section is in fluidic communication with a second cylinder bank.

In any of the aspects or combinations of the aspects, the lattice structure may be positioned external to an engine compartment and where the engine compartment may at least partially enclose the first cylinder bank and the second cylinder bank.

In any of the aspects or combinations of the aspects, the housing of the intake manifold and the lattice structure may be constructed out of aluminum.

In any of the aspects or combinations of the aspects, the intake system assembly may further include a flow diverter coupled to the housing and directing airflow into the lattice structure and where the flow diverter is arranged at a non-perpendicular angle with regard to the outer surface of the housing.

In any of the aspects or combinations of the aspects, the plurality of intersecting walls in the lattice structure may include a first wall intersecting a second wall at a different angle than an angle formed between a third wall and a fourth wall.

In any of the aspects or combinations of the aspects, the plurality of intersecting walls in the lattice structure may include a first wall intersecting a second wall at angle between 30 and 60 degrees.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An intake system assembly, comprising:
   an intake manifold including a housing defining an interior conduit in fluidic communication with an intake valve; and
   a lattice structure extending from an outer surface of the housing;
   where the lattice structure includes a plurality of intersecting walls and a plurality of airflow channels are formed between the plurality of intersecting walls and extend between two opposing sides of the lattice structure; and
   where the lattice structure and the housing form a continuous piece of material.

2. The intake system assembly of claim 1, where the intake manifold includes a first section and a second section and the lattice structure extends between the first and second sections.

3. The intake system assembly of claim 2, where the first section is in fluidic communication with a first cylinder bank and the second section is in fluidic communication with a second cylinder bank.

4. The intake system assembly of claim 1, further comprising a flow diverter coupled to the housing and directing airflow into the lattice structure.

5. The intake system assembly of claim 4, where the flow diverter is arranged at a non-perpendicular angle with regard to the outer surface of the housing.

6. The intake system assembly of claim 1, where the lattice structure is positioned external to an engine compartment.

7. The intake system assembly of claim 1, where the lattice structure and the housing are constructed out of an equivalent material.

8. The intake system assembly of claim 7, where the equivalent material is aluminum.

9. The intake system assembly of claim 1, where the intake manifold and the lattice structure are cooperatively constructed using additive manufacturing.

10. A method for manufacturing an intake system assembly, comprising:
    printing a plurality of layers of metal to form the intake system assembly including an intake manifold and a lattice structure forming a continuous shape;
    where the intake manifold includes a housing defining an interior conduit in fluidic communication with an intake valve;
    where the lattice structure extends from an outer surface of the housing; and
    where the lattice structure includes a plurality of intersecting walls and a plurality of airflow channels are formed between the plurality of intersecting walls and extend between two opposing sides of the lattice structure.

11. The method of claim 10, where the plurality of layers of metal are layers of aluminum.

12. The method of claim 10, where printing the plurality of layers of metal includes implementing a direct laser metal sintering process.

13. The method of claim 10, where the lattice structure is positioned external to an engine compartment.

14. The method of claim 10, where the intake manifold includes a first section and a second section and where the lattice structure extends between the first and second sections.

15. An intake system assembly, comprising:
    an additively manufactured intake manifold and a lattice structure forming a continuous shape;
    where the additively manufactured intake manifold includes a housing defining an interior conduit in fluidic communication with a plurality of intake runners providing intake air to a plurality of intake valves;
    where the lattice structure extends from an outer surface of the housing; and
    where the lattice structure includes a plurality of intersecting walls defining a plurality of airflow channels positioned between the plurality of intersecting walls.

16. The intake system assembly of claim 15, where the additively manufactured intake manifold includes a first section and a second section and the lattice structure extends there between and where the first section is in fluidic communication with a first cylinder bank and the second section is in fluidic communication with a second cylinder bank.

17. The intake system assembly of claim 16, where the lattice structure is positioned external to an engine compartment and where the engine compartment at least partially encloses the first cylinder bank and the second cylinder bank.

18. The intake system assembly of claim 15, where the housing of the additively manufactured intake manifold and the lattice structure are constructed out of aluminum.

19. The intake system assembly of claim 15, further comprising a flow diverter coupled to the housing and directing airflow into the lattice structure and where the flow diverter is arranged at a non-perpendicular angle with regard to the outer surface of the housing.

20. The intake system assembly of claim 15, where the plurality of intersecting walls in the lattice structure includes a first wall intersecting a second wall at an angle between 30 and 60 degrees.

* * * * *